Feb. 8, 1949.　　　　W. L. GRAY　　　　2,461,210
AIRCRAFT STRUCTURAL LIMIT INDICATOR
Filed June 27, 1945　　　　3 Sheets-Sheet 1

William Lee Gray INVENTOR.
BY Loyal J. Miller
ATTORNEY

Feb. 8, 1949. W. L. GRAY 2,461,210
AIRCRAFT STRUCTURAL LIMIT INDICATOR
Filed June 27, 1945 3 Sheets-Sheet 2

William Lee Gray
INVENTOR.

ATTORNEY

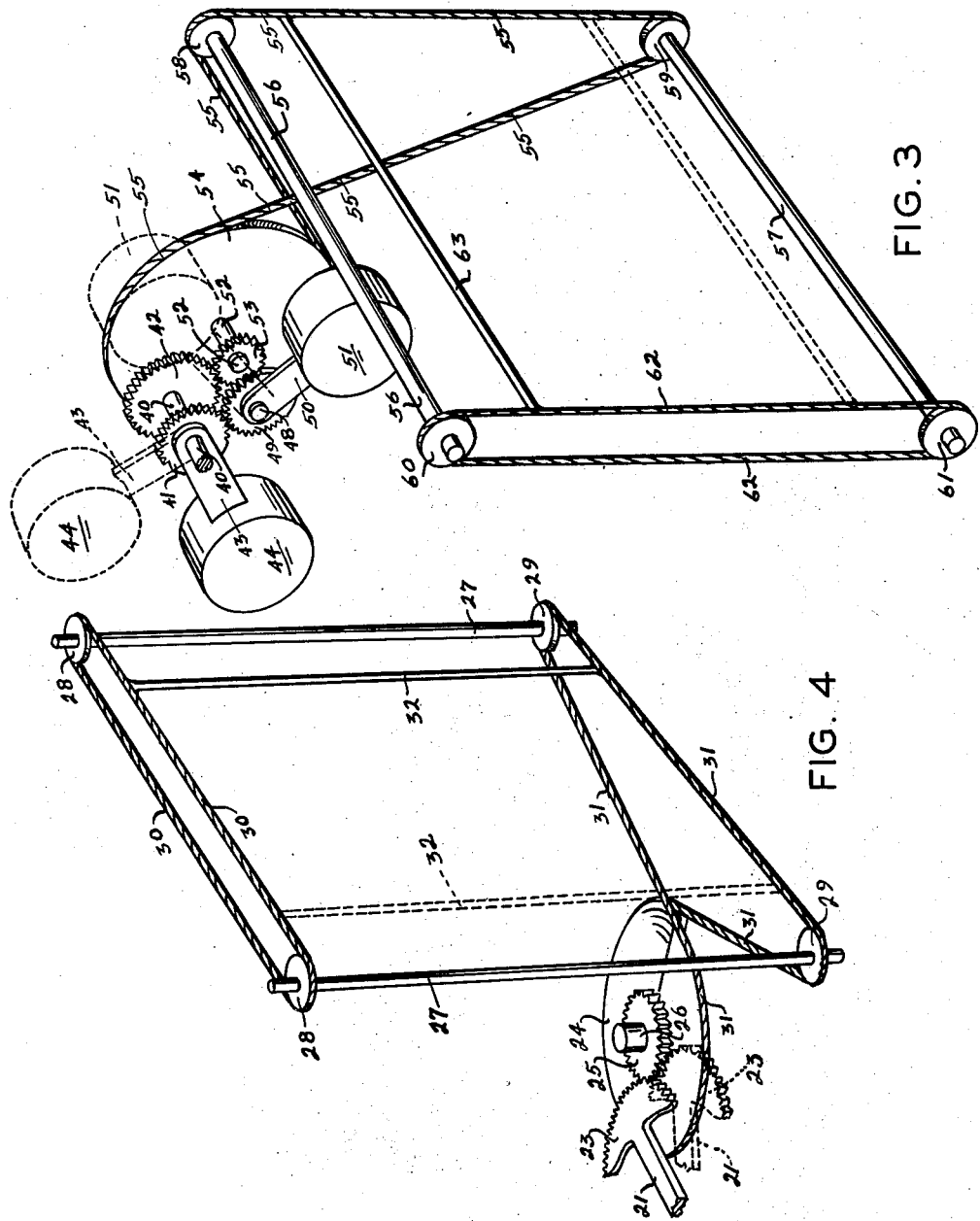

Patented Feb. 8, 1949

2,461,210

UNITED STATES PATENT OFFICE 2,461,210

AIRCRAFT STRUCTURAL LIMIT INDICATOR

William L. Gray, Wichita, Kans.

Application June 27, 1945, Serial No. 601,883

4 Claims. (Cl. 73—178)

My invention relates to aircraft instruments, and more particularly to an instrument which will indicate to a pilot when he is flying under conditions which subject the ship to stresses or strains approaching or passing the safe structural limits for which it has been constructed.

Air speed indicating instruments have heretofore been combined with a visible or audible signal to produce a stall warning indicator. Air speed indicators have also been combined with accelerometer mechanisms in order to produce a declinometer. Lift measuring instruments have also been combined with angle of incidence measuring instruments in order to create stallmeters. However, so far as I know, or have been able to ascertain, no flying instrument has so far been designed which acts as a means for keeping the pilot acquainted with instant flying conditions in so far as they might exert dangerous stresses or strains upon the craft.

It is therefore an object of the present invention to provide an instrument which will give the pilot visual notice as to whether or not he is subjecting his ship to flying conditions which dangerously stress it.

Another object is to provide an instrument of this class which is positive in action and automatic in function.

A further object is to provide an instrument which may be accommodated to different individual ships, or types of ships, by the mere insertion of a diagram calibrated for the particular ship in which the instrument is to be installed.

Another object is to provide an instrument for the purposes set forth which combines an indicating mechanism that is affected by air speed, and another mechanism which is affected by variations of changes in the flight attitude of the craft.

Other objects will be apparent from the following description when taken in conjunction with the accompanying three sheets of drawings, wherein:

Figure 3 is a fragmentary perspective view of a cable and pulley train which is used to actuate one of the indicators of the device;

Figure 4 is a similar view of a pulley and cable train used to actuate another indicator of the device; and, Figure 5 is an enlarged fragmentary perspective view detailing a portion of the mechanism.

Like characters of reference designate like parts in all the figures wherein they occur.

In the drawings:

Figure 1:
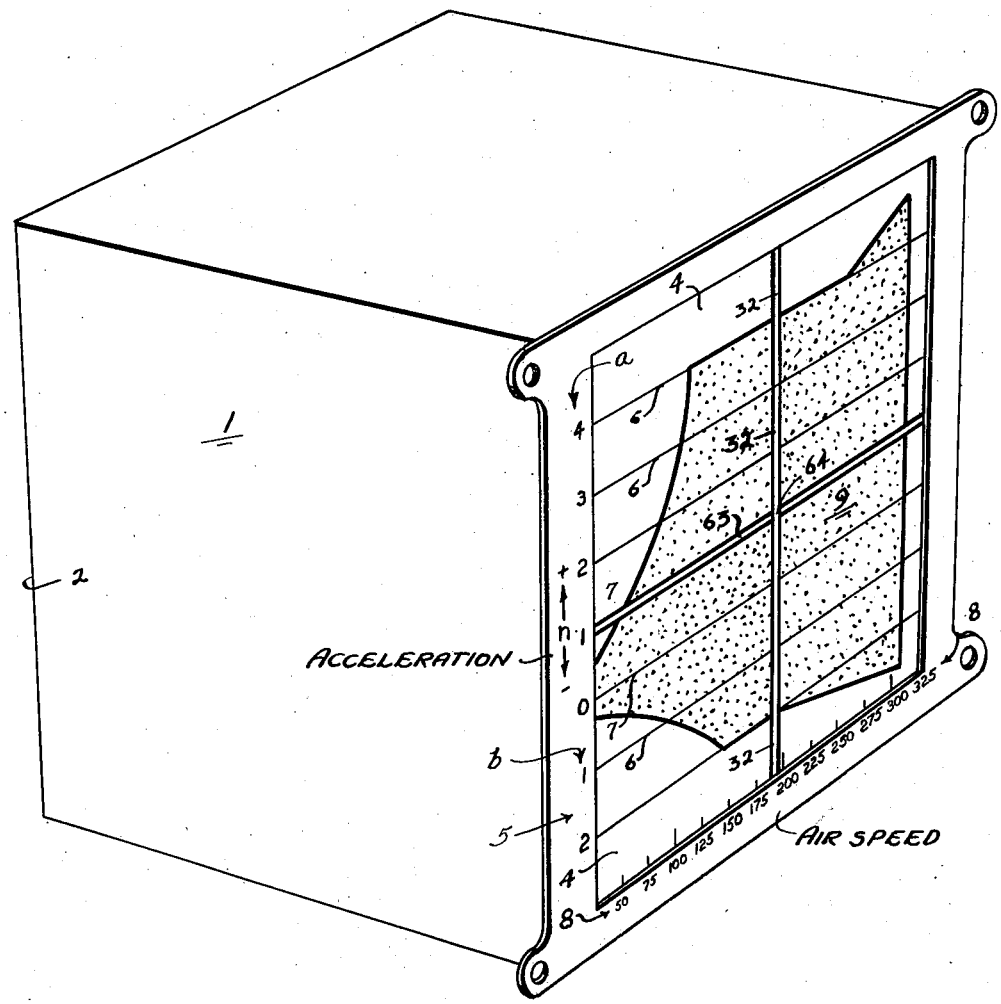
Figure 1 is a perspective view of one form of the instrument case or housing, showing one form of visual diagram or indicator face.
Figure 5:
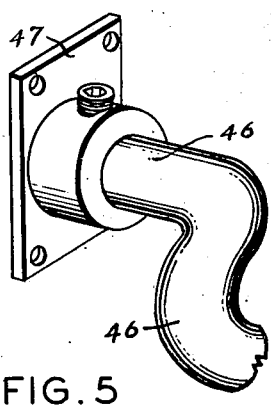

The reference numeral 1 indicates, as a whole, an instrument case or box having a front face 2 and a vertical rear face 3. The case is adapted to be rigidly mounted in an aircraft, with the face 2 facing toward the front of the craft in a position in which the rear face 3 is visible to the pilot. The case 1 should be mounted with its top, bottom and two sides extending parallel to the longitudinal axis of the craft. The face 3 is formed of, or is closed by, a pane of some desired transparent or translucent material such as glass, for a purpose more fully described hereinbelow, and the other walls of the case are entirely closed to make the case air tight, except for a small air-vent, not shown, which is connected to the static air pressure line from a pitot-static head.

The pane 4 at the rear face 3 of the case is provided with a suitable velocity-gravity diagram or chart 5, drawn to delineate the safe structural design limits of the specific aircraft within which the instrument is to be mounted. This diagram 5 has horizontal lines 6 which are indicated permanently at the edge of the diagram by numerals graduated in both vertical directions from a zero line 7. The upper graduations are indicated by the reference character $a$, while the lower graduations are indicated by the character $b$.

The horizontal lines 6 represent different magnitudes of acceleration, including the condition of normal straight and level flight to which the aircraft may be subjected. The zero line 7 represents a condition of zero acceleration.

The diagram 5 is further provided with a horizontal row 8 of spaced numerals, each of which indicates a different vertical line of graduation, the vertical lines representing air speeds of the craft in flight.

The diagram 5 further includes a shaded area, indicated as a whole by reference numeral 9. This shaded area 9 is bounded by a heavy line which is so shaped that it envelops all of those portions of the horizontal lines 6, which if intersected by the vertical graduation lines, would indicate a combination of air speed and acceleration for which the particular craft was designed. The shape and size of the shaded area 9 varies for each individual craft, or type of craft, according to the structural limits for which the craft is designed. It is therefore thought to be apparent that if a means is provided for indicating on the diagram 5, both the instant air speed and the acceleration being placed upon the craft in flight, when the intersection 64 of the indcators 32 and 63 fall within the shaded area 9, the pilot may well assume that he is operating the craft within its structural design limits. As a means of furnishing such an indicating means, the following described structure is provided within the case 1. The air speed indicating portion of the device includes the following described apparatus. An aneroid bellows 10 which is disposed within the case 1 and which has its end portion 11 rigidly mounted with relation to the case. An air pressure or pitot tube 12 leads from the case 1, and has an open end, not shown, which is disposed exteriorly of the craft facing toward the front thereof so that air is rammed into the tube and bellows by relative motion between the aircraft and the surrounding air.

The length of the bellows varies in accordance with the internal pressure created by the rammed air, in the usual manner. The bellows 10 has a closed end 13 to which is attached a projecting ear 14. Adjacent to, but to one side of the path of travel of the closed end 13 of the bellows, there is provided a vertical shaft 15. The shaft 15 is journalled for rotation in suitable bearings, not shown, but which are carried by the adjacent wall of the case 1. A horizontal arm 16 has one of its ends rigidly attached to the shaft 15 by a key 17, and its other end is pivotally engaged around a pivot pin 18 carried by one end of a link 19. The other end of the link 19 is pivotally connected to the ear 14 by a pin 20. A horizontally disposed arm 21 has one of its ends rigidly attached to the shaft 15 by a key 22, and its other end carries a gear segment 23.

Obviously, longitudinal expansion of the bellows 10 acts to move the closed end 13, the ear 14 and the link 19, and such movement causes the arm 16 to partially rotate the shaft 15. Also, partial rotation of the shaft 15 acts to move the arm 21 in an arcuate horizontal path which similarly moves the gear segment 23.

The air speed indicator mechanism further includes a pulley 24 and gear 25 both of which surround and are keyed to a vertically disposed shaft 26. The shaft 26 is journalled for rotation in suitable bearings, not shown, carried by the case 1, and the gear 25 is in meshed engagement with the gear segment 23.

Within the case 1, and at each side of the rear face 3 thereof, there are provided vertically disposed shafts 27. Each of the two shafts 27 carries two rigidly mounted pulleys located adjacent opposite ends of the shafts 27. The two upper pulleys are indicated by the two reference numerals 28, and the lower pulleys by the numerals 29. The ends of the two shafts 27 are journalled for rotation in bearings, not shown, carried by the case 1. An endless wire or cable 30 is engaged around the two upper pulleys 28, so that they must rotate in unison.

A second endless cable 31 extends substantially around the pulley 24, and continues from there to engage the outer surfaces of the two lower pulleys 29 carried by the shafts 27, as more clearly shown in Fig. 4. The cable 31 is so arranged that rotative movement of the pulley 24 in one direction will cause rotation of the pulleys 29 in an opposite direction. In other words, anti-clockwise movement of the pulley 24 will cause left hand travel of that portion of the cable 31 which extends directly between the two pulleys 29 adjacent the rear face 3, and vice versa.

Extending between and attached to vertically aligned points on the two cables 30 and 31, is a vertically disposed air speed indicating rod 32. The rod 32 is located sufficiently close to the transparent face 3 of the case 1, that it is readily visible therethrough.

Figure 2:
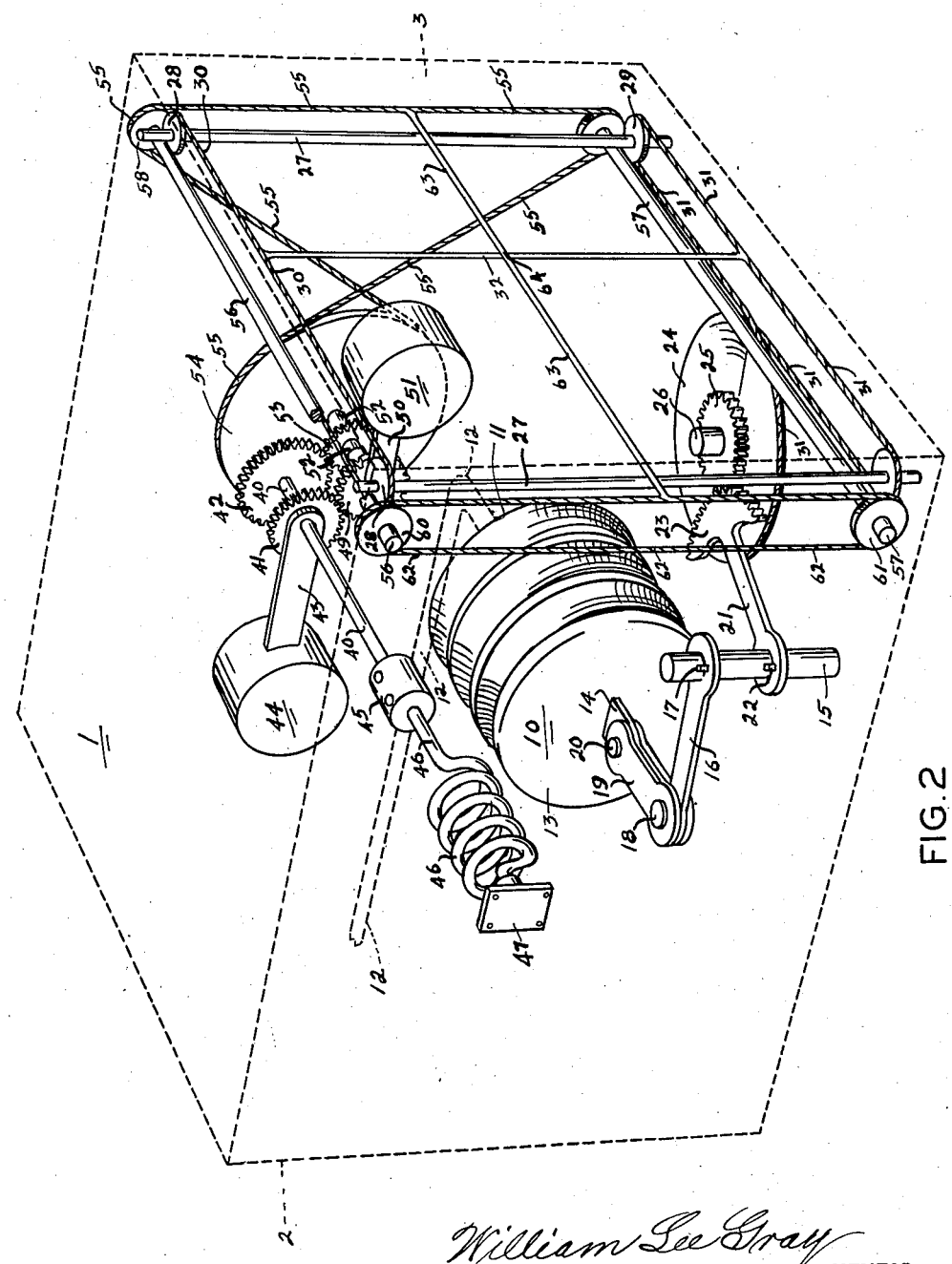
Figure 2 is a perspective view of the instrument mechanism, shown in a more or less schematic form, within the case.

From the above description and by reference to Fig 2 of the drawings, it is apparent that extending movement of the closed end 11 of the bellows 10 will cause clock-wise movement of the pulley 24, and such movement of the pulley 24 will likewise cause movement of the indicating rod 32 to the right across the face of the diagram 5. Contraction of the bellows, will, of course, cause a left hand movement of the rod 32. It is also apparent that the rod 32 will be moved in either direction a distance which is a function of the air speed of the craft. The comparative diameters of the pulley 24 and pulleys 29, the pitch radii of gears 23 and 25, and the ratio of lengths of the arms 16 and 21 are such that the velocity indicating rod 32 may be moved substantially across the end 3 of the case by expansion and contraction of the bellows 10. The vertical graduation lines, indicated by the row 8 of numerals, are so correlated with the possible travel of the indicating rod 32, that all of the probable air speeds of the craft in flight may be indicated by the rod 32.

As stated hereinabove, the device further includes mechanism for indicating the magnitudes of acceleration, relative to a specific axis of the aircraft, to which it is subjected while in operation. This mechanism includes the following described parts.

Journalled for rotation in the case 1, in suitable bearings, not shown, there is provided a horizontal shaft 40 which is perpendicular to the center line of the craft, and upon which are rigidly keyed gears 41 and 42. Also keyed to the shaft 40 is one end of an arm 43 which carries, at its other end, a weight 44. The arrangement is such that the weight 44 may swing in a vertical plane with the shaft 40 acting as a pivotal axis. One end of the shaft 40 is rigidly attached by a coupler 45 to a torsion spring 46, the other end of which is rigidly attached by a fitting 47 to a wall of the case 1. The torsion spring 46 resiliently and elastically resists rotation of the shaft 40 in both directions. The arm 43 is therefore normally maintained in a position substantially parallel to the longitudinal axis of the aircraft.

Pivotally mounted in the housing 1, in suitable bearings, not shown, is a short horizontal shaft 48 (see Fig. 3) which is keyed to a gear 49 meshing with the teeth of the gear 41. Also keyed to the shaft 48 is one end of an arm 50, the other end of which carries a weight 51. The weight 51 weighs the same as does the weight 44 and acts as a counterbalance to the weight 44 when the weight 51 is acted upon by a vertical acceleration normal to the longitudinal axis of the craft oppositely directed to the acceleration to which the weight 44 is subjected, or when the weights are both subjected to the same accelerations which are parallel to the longitudinal axis of the aircraft and the weights 44 and 51 are deflected to positions such that the arms 43 and 50 respectively are not substantially parallel to the longitudinal axis of the aircraft.

The inherent strength of the spring 46 to resist rotation of the shaft 40 is such, compared to the weight of the objects 44 and 51, that the arms 43 and 50 will remain in a substantially horizontal position during normal straight ahead flight of the craft. Due to the action of the gears 49 and 41, the arms 50 and 43 and the weights 51 and 44 will at all times be deflected through equal distances from their normal or horizontal position. For the purpose of illustration, assume for the moment that under the action of a positive vertical acceleration the weights 51 and 44 are deflected to a position below their normal position. If, while in this deflected position, the weights 51 and 44 are subjected to an acceleration parallel to the longitudinal axis of the aircraft, in either direction, it is apparent that the weights will not be moved from the position they assumed under the action of the vertical acceleration acting alone, and consequently the acceleration responsive system of the instrument is responsive only to the effects of vertical accelerations which are normal to the longitudinal axis of the aircraft. However, the weights 44 and 51 will be affected by accelerations of the aircraft in either direction along its normal or vertical axis, and the resultant movement of the weights will partially rotate the shaft 40, and the gears 41 and 42.

The term "horizontal" as used herein in connection with the normal position of the arms 43—50 and the weights 44—51, is intended to mean a position such that the horizontal plane containing the center line of the shaft 56, also contains the center of gravity of the combined mass comprised of the arm 50 and the weight 51, and that the horizontal plane containing the center line of the shaft 40 also contains the center of gravity of the combined mass composed of the arm 43 and the weight 44, and both such planes extend in directions parallel to the longitudinal axis of the craft, and parallel to the wing span of the craft.

The mounting arrangement of the two weights 44—51 is such that at any time the craft commences to operate in a direction which involves vertical accelerations (i. e. accelerations in a direction normal to both the longitudinal axis of the craft, and to the spanwise axis of the craft), the weights will be moved from their normal horizontal positions. This is in accordance with the proven law of physics that "bodies in motion tend to remain in motion unless disturbed by an external force." Should the ship while in straight flight suddenly be put into a steep bank, or a dive, or should its nose suddenly be turned upwardly, the tendency of the weights will be to continue to travel in their original paths in space. Since the position of the case 1 in space changes with the position of the body of the ship in space, the positions of the weights will change with relation to the longitudinal axis of the ship, and consequently with relation to the case 1. If the ship in high speed level flight is suddenly put in a bank or into a climb, the force of inertia causes the weights to try to continue in a straight line, and they will actually do so to some extent. Since the plane and instrument case have actually moved upward with relation to their former path, the weights move downward in the case. As soon as the airplane has resumed straight line flight, regardless of direction, the weights assume stationary positions near their original horizontal positions, the actual positions depending on the attitude of the airplane, the spring, and the effect of gravity. Should a ship in level flight suddenly be nosed down, the force of inertia which causes the above described movement of the weights is actually very similar to centrifugal force. (Same physical law governs.) The main difference is that in the present device, the axis around which the weights move is continually changing its position in space due to the motion of the ship as a whole. By the same token, when the ship is pulled out of a dive, i. e., along a curved path, the weights will move toward the bottom of the case. In this case, movement of the weights is greater, however, due to the additional force of gravity.

It is pointed out that should the craft, while in horizontal flight, be suddenly forced upward by an "up-current" or "gust" of air, the inertia weights will move toward the bottom of the case. Similarly, a down draft or "gust" will cause movement of the inertia weights toward the top of the case.

Rotatably mounted in the case 1 in suitable bearings not shown, there is provided another horizontal shaft which is indicated by the reference numeral 52, and which lies adjacent and parallel to the above described shaft 40. The shaft 52 has a gear 53 keyed thereon adjacent the shaft's end. The gear 53 is in continuous meshing engagement with the above described gear 42 on the shaft 40. Also keyed to the shaft 52 is a pulley 54 having a peripheral groove for receiving an endless cable or cord 55. The function of the cord 55 will be more fully described hereinbelow. It is obvious that rotative movement of the shaft 40, through action of the weights 44—51, will rotate the gears 42—43, the shaft 52, and consequently the pulley 54.

In order to indicate to the pilot the magnitude of the vertical accelerations to which the airplane is being subjected, occasioned by his maneuvering of the ship, the following described mechanism is provided.

Within and adjacent to the top of the case 1, and near the rear face thereof, a horizontal shaft 56 is journalled for rotation. A similar horizontal shaft 57 is rotatably journalled adjacent the bottom of the case. The shaft 56 is equipped adjacent one end with a pulley 58, and the similar end of the shaft 57 is equipped with a pulley 59. The endless cable 55 is threaded over the two pulleys 58 and 59, and partially surrounds the pulley 54. The other ends of the shafts 56 and 57 are respectively provided with aligned pulleys 60 and 61. An endless cord or cable 62 connects these two pulleys 60 and 61. Obviously when the pulley 54 is driven to partial rotation by movement of the inertia weights, as above described, the two shafts 56 and 57 will rotate in unison.

Extending between the two cables 55 and 62 is a horizontal indicating rod 63, which is adapted to move vertically when the pulley 54 is rotated.

The indicating rods 32 and 63 are so located that they move in closely adjacent parallel planes. Since both rods lie adjacent the transparent pane 4 which closes the end 3 of the case 1, they are both visible to the pilot. Similarly, since both rods travel along the face of the diagram 5, their point 64 of intersection may easily be read on the chart by the pilot.

The shaded area 9 of the diagram or chart 5 is so designed, that so long as the point 64 of the intersection of the two indicating rods remains within the boundary line of the shade area 9, the pilot knows that he is not subjecting his ship to dangerous flying conditions which will cause stresses beyond its structural design limits.

As stated hereinabove, the diagram 9 is drawn to represent the safe limits of each specific ship or type of ships in which the instrument is to be installed. It therefore becomes unnecessary to provide different instruments for different classes of ships, nor is it necessary to mechanically adjust the instrument mechanism to accommodate different ships or classes of ships. It is only necessary to provide each ship with a chart, having its shaded area 9 drawn to fit that particular ship or class of ships.

The chart disclosed herein might well be termed a "velocity-gravity diagram." However, in this case, the word "gravity" refers to the relative measure of the force of inertia, in terms of gravity, and not to the force of gravity. This term is widely used throughout the aircraft industry. For instance, "plus 3 G's" on the chart means that the wings and other component parts of the ship are being subject to loads equal to three times the loads to which they would be subjected during straight normal flight of the craft. "(−2 G's)" means the ship parts are being subjected to a load in the opposite sense, equal to two times the loads incurred during straight normal flight of the craft.

It is pointed out that by properly calibrating the chart, the mechanism may also be used to give the readings of a stallmeter.

From the above description, and by reference to the accompanying drawings, it is thought an instrument has been disclosed which will accomplish all of the objects and purposes for which it is intended. The structure shown in the drawings, and described hereinabove, only disclose one embodiment of the invention, and might well be subjected to modification and alteration, and I therefore do not limit myself to the specific embodiment shown, further than I am limited by the scope of the appended claims.

I claim:

1. An instrument in and for an aircraft, for continuously indicating the simultaneous magnitudes of the accelerations and velocities to which said aircraft is being subjected during operation, comprising: a velocity acceleration diagram on which any point represents a specific velocity and a specific acceleration; a pair of intersecting indicators mutually co-operating to locate a point on said velocity acceleration diagram; means responsive to the velocity of the aircraft and operably connected to one of said indicators for moving the same; and means responsive to the accelerations of said aircraft relative to a specific axis thereof, said means operably connected to the other of said indicators for moving the same.

2. An instrument in and for an aircraft, for continuously indicating the co-existing magnitudes of the accelerations and velocities to which said aircraft is being subjected during operation, comprising: a velocity acceleration diagram on which any point represents a specific velocity and a specific acceleration; an outline on said diagram defining the combinations of speed and acceleration for which said aircraft was structurally designed; a pair of intersecting indicators mutually co-operating to locate a point on said diagram; means responsive to the velocity of the aircraft and operably connected to one of said indicators for operating the same; means responsive to accelerations of said aircraft relative to a specific axis thereof, said means operably connected to the other of said indicators for operating the same, the positions of said two indicators with relation to each other and to said diagram being adapted to apprise an occupant of the aircraft as to whether or not the craft is being subjected to combinations of acceleration and velocity beyond its safe structural limits.

3. An instrument in and for an aircraft, for continuously indicating the simultaneous magnitudes of the accelerations and velocities to which said aircraft is being subjected during operation, comprising: a velocity acceleration diagram the outline of which defines the safe structural limits to which the craft may be subjected, and on which any point represents a specific velocity and a specific acceleration; a pair of intersecting indicators mutually co-operating to locate a point on said velocity acceleration diagram; means responsive to the velocity of the aircraft and operably connected to one of said indicators for moving the same; and means responsive to the accelerations of said aircraft relative to a specific axis thereof, said means operably connected to the other of said indicators for moving the same.

4. An instrument in and for an aircraft for continuously indicating visually on one diagram the magnitudes of the accelerations and velocities to which said aircraft is being subjected, comprising: a velocity acceleration diagram having two intersecting axes; indicia, indicating aircraft velocity, and dividing one axis of said diagram; indicia, indicating the magnitudes of acceleration to which the aircraft may be subjected, and dividing the other axis of said diagram; a first indicator co-operating with said diagram and movable with respect to the first mentioned indicia; means affected by changes in aircraft velocity and operably connected to said first indicator for moving the same; a second indicator also co-operating with said diagram and movable with respect to the second mentioned indicia; means affected by changes in acceleration of the aircraft in the direction of a predetermined axis, and operably connected to said second indicator for moving the same, the position of said two indicators with relation to each other and to said diagram being adapted to apprise the observer as to whether or not the aircraft is being subjected to abnormal stresses during flight.

WILLIAM L. GRAY.

REFERENCES CITED

The following references are of record in the file of this patent:

UNITED STATES PATENTS

| Number | Name | Date |
|---|---|---|
| 1,451,923 | Pierce | Apr. 17, 1923 |
| 1,924,658 | Sanders | Aug. 29, 1933 |
| 1,948,030 | Goldsworthy | Feb. 20, 1934 |
| 2,057,336 | Leatherman | Oct. 13, 1936 |
| 2,139,694 | Reid et al. | Dec. 13, 1938 |
| 2,262,007 | Kollsman | Nov. 11, 1941 |
| 2,277,625 | Baynes | Mar. 24, 1942 |
| 2,278,219 | Shanley | Mar. 31, 1942 |
| 2,293,234 | Winter | Aug. 18, 1942 |

FOREIGN PATENTS

| Number | Country | Date |
|---|---|---|
| 499,004 | Germany | June 6, 1930 |